(12) United States Patent
Otohata et al.

(10) Patent No.: US 8,697,277 B2
(45) Date of Patent: Apr. 15, 2014

(54) FILM-CLAD BATTERY AND METHOD OF PRODUCING FILM-CLAD BATTERY

(75) Inventors: Makihiro Otohata, Sagamihara (JP); Hiroshi Yageta, Sagamihara (JP)

(73) Assignee: NEC Corporation, Tokyo (JP)

( * ) Notice: Subject to any disclaimer, the term of this patent is extended or adjusted under 35 U.S.C. 154(b) by 1432 days.

(21) Appl. No.: 10/574,562

(22) PCT Filed: Sep. 30, 2004

(86) PCT No.: PCT/JP2004/014364
§ 371 (c)(1),
(2), (4) Date: Apr. 4, 2006

(87) PCT Pub. No.: WO2005/036674
PCT Pub. Date: Apr. 21, 2005

(65) Prior Publication Data
US 2007/0009795 A1    Jan. 11, 2007

(30) Foreign Application Priority Data
Oct. 7, 2003 (JP) .................................. 2003-348126

(51) Int. Cl.
*H01M 2/02* (2006.01)
*H01M 2/08* (2006.01)

(52) U.S. Cl.
CPC ............ *H01M 2/021* (2013.01); *H01M 2/0212* (2013.01); *H01M 2/0267* (2013.01); *H01M 2/0275* (2013.01); *H01M 2/0287* (2013.01)
USPC ............ 429/185; 429/162; 429/176; 429/179

(58) Field of Classification Search
CPC . H01M 2/021; H01M 2/0212; H01M 2/0267; H01M 2/0275; H01M 2/0287; H01M 2/08
USPC .......................... 429/185, 162, 163, 176, 178
See application file for complete search history.

(56) References Cited

U.S. PATENT DOCUMENTS

| | | | |
|---|---|---|---|
| 3,907,193 A | | 9/1975 | Heller |
| 6,358,644 B1 * | | 3/2002 | Shibata et al. ................. 429/162 |
| 6,451,476 B1 | | 9/2002 | Chang et al. |
| 6,632,538 B1 * | | 10/2003 | Yamazaki et al. ............. 429/176 |

FOREIGN PATENT DOCUMENTS

| | | | |
|---|---|---|---|
| EP | 1184914 A1 | 2/2001 | |
| EP | 1184914 A1 * | 3/2002 | ............. H01M 2/02 |
| JP | 5-56425 U | 7/1993 | |
| JP | 10-264244 A | 10/1998 | |
| JP | 11-334022 A | 12/1999 | |
| JP | 2000-156208 A | 6/2000 | |
| JP | 2000-223088 A | 8/2000 | |
| JP | 2000-268807 A | 9/2000 | |

(Continued)

*Primary Examiner* — Edu E Enin-Okut
(74) *Attorney, Agent, or Firm* — Sughrue Mion, PLLC (57) ABSTRACT

A joint section where covering films $2a$, $2b$ of film-covered battery 1 are heat-sealed together is formed with flat surface $6'$ having thickness $t_1$ and groove 6 having thickness $t_2$. Groove 6 serves to reduce the projection area of film-covered battery 1 by folding side $2c$ toward receiving section $2a1$ with groove 6 serving as an edge, and groove 6 is made thinner than flat surface $6'$ by $\Delta t = t_1 - t_2$. Therefore, the length of covering films $2a$, $2b$ produced on outer side $6a$ is shortened as compared with the case of folding the portion that has thickness $t_1$.

10 Claims, 10 Drawing Sheets

(56) References Cited

FOREIGN PATENT DOCUMENTS

| JP | 2001-319630 A | 11/2001 |
| JP | 2002-25514 A | 1/2002 |
| JP | 2002-319374 A | 10/2002 |
| JP | 2002-319375 A | 10/2002 |
| JP | 2002319374 A * | 10/2002 |
| WO | WO 01/56093 A1 | 8/2001 |

* cited by examiner

FILM-CLAD BATTERY AND METHOD OF PRODUCING FILM-CLAD BATTERY

This application claims priority from PCT Application No. PCT/JP2004/014364 filed Sep. 30, 2004, and from Japanese Application No. 2003-348126 filed Oct. 7, 2003, which applications are incorporated herein by reference.

TECHNICAL FIELD

The present invention relates to a film-covered battery which has a battery element encapsulated in a flexible materials used to cover the battery, and a method of producing the film-covered battery.

BACKGROUND ART

In recent years, a reduction in weight and thickness has been strictly required for batteries as a power supply for portable devices and the like. Thus, in regard to materials used to cover the batteries, laminate films capable of a further reduction in weight and thickness have been used more and more instead of conventional metal cans in which there is a limit to weight and thickness reductions. This laminate film which can be freely formed into different shapes, compared with a metal can, comprises a thin metal film or a laminate of a thin metal film and a heat-seal resin film.

As a representative example of a laminate film used for materials used to cover the batteries, there is a three-layer laminate film that has a heat-seal resin film, which is a heat seal layer, laminated on one side of an aluminum thin film, which is a thin metal film, and a protection film laminated on the other side.

Generally, in a film-covered battery which uses a laminate film for a covering material, a battery element comprising a positive electrode, a negative electrode, an electrolyte and the like is hermetically sealed (hereinafter simply called "sealed") by covering the battery elements with the covering material in such a manner that heat-seal resin film is positioned inside, and by heat-sealing the covering material around the battery element. Polyethylene or polypropylene, for example, is used for the heat-seal resin film, while a nylon film or a polyethylene terephthalate film, for example, is used for the protection film.

For reference, as a battery element, other than chemical batteries such as a lithium battery, a nickel hydrogen battery and the like, those having a charge accumulating function such as a capacitor also use laminate film as a covering material.

In a film-covered battery, lead terminals are connected to a positive electrode and a negative electrode of a battery element, respectively, for leading the positive electrode and negative electrode to the outside of the covering material to extend these lead terminals from the covering material. The lead terminals are connected to the battery element by ultrasonic welding or the like before the battery element is sealed. Also, the battery element is sealed by sandwiching the battery element with two sheets of covering material, and by heat-sealing the covering materials along the peripheral edge. The covering materials are heat-sealed by first heat-sealing three sides of the covering materials for formation into a bag. Subsequently, air is exhausted from the interior of the covering materials to produce a vacuum inside the covering materials, the covering materials are brought into close contact with the battery element by atmospheric pressure, and the one side that remains is heat-sealed in this state.

When the battery element has a certain degree of thickness, the general approach is to form one of the covering materials into the shape of a collared container shape by deep-draw molding, such that the battery element is readily received therein, cover the covering material formed into the container shape from above the battery element, and join the collar by thermal fusing.

For preventing external moisture and the like from being introduced into the film-covered battery and to prevent the electrolytic solution and the like within the film-covered battery from escaping to the outside, a thin metal film of aluminum or the like is used in the covering film as a barrier layer, but the heat-seal resin film layer is exposed along the edge of the joint section around the battery element, causing a leak path based on the molecular transport phenomenon of the resin itself. Therefore, to improve the reliability of sealing for the film-covered battery, the leak can be reduced by increasing the width of the joint section to extend the transmission path and to increase the resistance, however this causes the problem that a larger projection area of the film-covered battery. Thus, JP-A-2002-25514 proposes a reduction in projection area by folding a joint section toward a battery element receiving section.

DISCLOSURE OF THE INVENTION

However, the foregoing folded joint section of the conventional film-covered battery causes a problem of possible damage such as cracks that open in the folded portion because of the inability of the outside layer to follow elongation of the film. This is because of the thickness of the laminate film causes a difference in elongation between the inside and outside of the fold of the film. This phenomenon will be described below with reference to FIGS. 1, 2, and 3.

Figure 1:
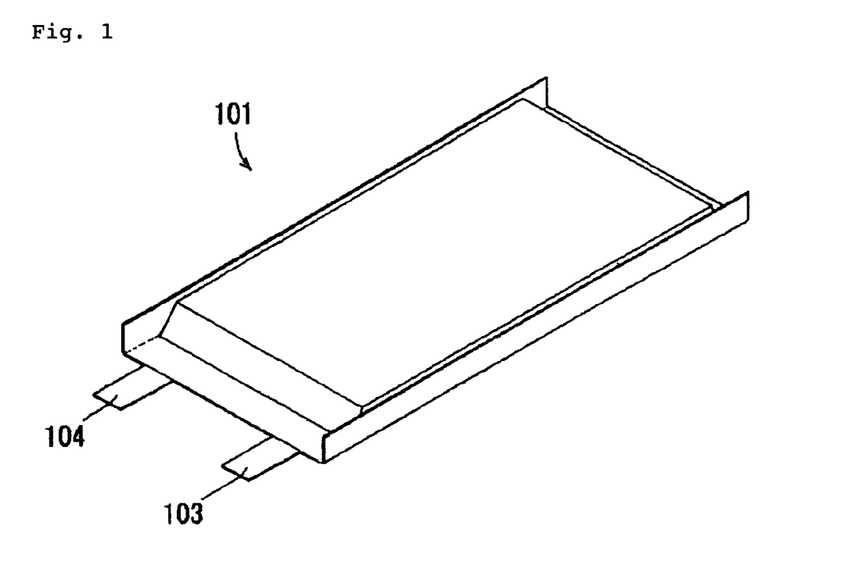
[FIG. 1]
A perspective view of a conventional film-covered battery.
Figure 2:
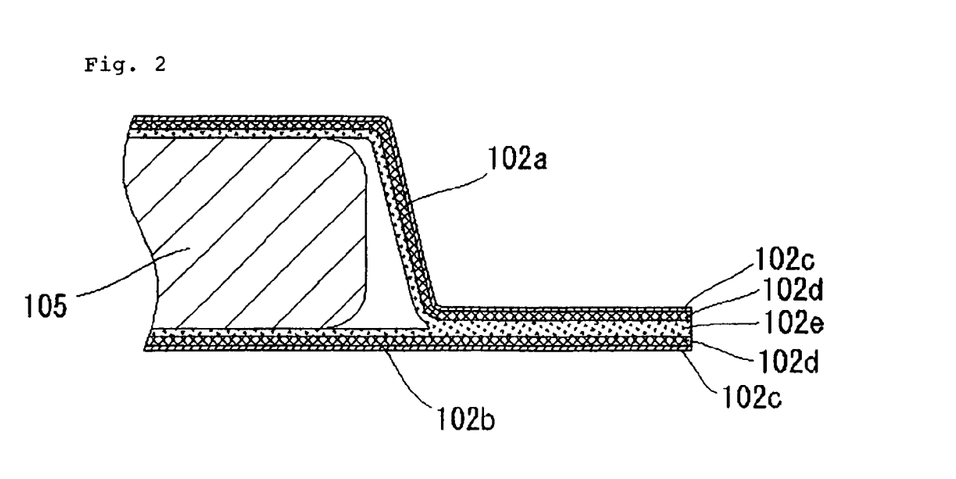
[FIG. 2]
A cross-sectional view of a joint section along the length a long side of the film-covered battery illustrated in FIG. 1 before it is folded.

For example, as illustrated in FIG. 1, film-covered battery 101 has a shape such that joint sections of two opposite sides are folded substantially at right angles toward a battery element receiving section in order to reduce the projection area a projection area. As can be seen in a cross-sectional view near a joint section before folding illustrated in FIG. 2, hardly any of protection film 102c, thin metal film 102d, and heat-seal resin film 102e hardly vary in thickness in the joint section.

Figure 3:
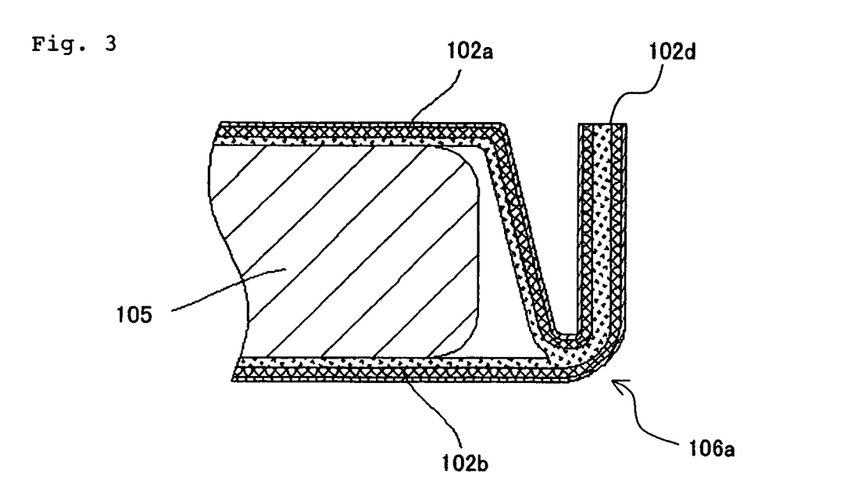
[FIG. 3]
A cross-sectional view of the joint section of the length long side of the film-covered battery illustrated in FIG. 1.

However, as illustrated in FIG. 3, when this joint section is folded from the bottom substantially at right angles toward the battery element receiving section, a layer on outer side 106a of the fold is elongated to become thinner, possibly causing a crack to appear. If a crack opens in thin metal film 102d layer, a leak path is created through the crack, and a short transmission path is formed from the crack to the interior of the battery, resulting in possible damage to the performance and to the reliability of film-covered battery 101.

To solve the foregoing problems, it is an object of the present invention to provide a film-covered battery which has a battery element encapsulated in a flexible covering material, which is capable of preventing the covering material from damage that occurs when a joint section is folded, and a method of producing the film-covered battery.

To achieve the above object, a film-covered battery of the present invention comprises battery elements having a configuration in which a positive electrode faces a negative electrode, and in which a covering film having at least a heat-seal resin layer and a thin metal film layer are laminated, for encapsulating the battery element with the heat-seal resin layer being positioned inside, and for sealing the battery element by heat-sealing a joint section having at least one folded side along a peripheral edge, and is characterized in that the joint section is formed with at least one fold, and the fold has a thickness smaller than a thickness of the joint section around the fold.

The film-covered battery of the present invention configured as described above is formed with the fold having a smaller thickness in the joint section. Specifically, since the fold has a smaller thickness, the outer side of the fold is not excessively elongated when the joint section is folded along the fold. It is therefore possible to prevent a crack from appearing due to elongation of the covering films. Also, since the existence of the fold defines the folded position, the joint section will not be folded at an inconvenient position. In this way, the film-covered battery after folding is readily made in uniform dimensions.

Also, in the film-covered battery, the fold may be a groove, or the groove may be formed in at least one side of the joint section.

Also, in the film-covered battery, a plurality of the folds may be formed in the joint section, such that the joint section is folded along each of the folds.

A film-covered battery of the present invention comprises a battery element having a configuration in which a positive electrode faces a negative electrode, and in which a covering film having at least a heat-seal resin layer and a thin metal film layer are laminated, for encapsulating the battery element with the heat-seal resin layer being positioned inside, and for sealing the battery element by heat-sealing a joint section having at least one folded side along a peripheral edge, and is characterized in that the joint section is formed with a plurality of folds, the folds have a thickness smaller than a thickness of the joint section around the folds, the folds are grooves formed in at least one side of the joint section, and the joint section is folded along each of the folds.

Also, in the film-covered battery, the battery element may be one of a chemical battery and a capacitor.

A fabrication method of a film covered battery of the present invention is characterized in having a battery element encapsulated within a covering film that has at least one folder joint section formed around the battery element, by comprising the steps forming at least one folder thinner than a thickness of the joint section therearound in the joint section, and folding the joint section along the fold.

The film-covered battery of the present invention configured as described above is formed with the fold having a smaller thickness in the joint section. For this reason, the force required for folding is reduced. Also, since the existence of the fold defines the folded position, the joint section will not be folded at an inconvenient position. In this way, the film-covered battery after folding is readily made in uniform dimensions. Further, since the outer side of the fold is not excessively elongated when the joint section is folded along the fold, a crack is unlikely to appear due to the elongation of the covering films, thus making it possible to produce a reliable film-covered battery.

Also, the fabrication method of a film-covered battery may include the step of forming the fold by pressing at least one side of the joint section with a member having a protrusion, or may include the step of heat-sealing and joining the joint section of the covering film having a heat-sealing property by heating and pressing the joint section with the member.

Also, the fabrication method of a film-covered battery may include the step of preparing one of a chemical battery and a capacitor as the battery element.

As described above, since the present invention forms a folded portion of the joint section of the covering films so that it is thinner, the folding operation is facilitated. Also, since the elongation on the outer side is reduced when the joint section is folded, the covering material can be prevented from incurring damage. From the foregoing, the present invention can prevent a crack from opening in the middle of the joint section to form a short transmission path into the interior of the battery, and can also prevent the introduction of moisture and the escape of an electrolytic solution from accelerating, thus making it possible to improve the performance and reliability of the battery.

BRIEF DESCRIPTION OF THE DRAWINGS

[FIG. 19]

A perspective view illustrating the state of the film-covered battery illustrated in FIG. 18 before a joint section is folded.

[FIG. 20]

An exploded perspective view illustrating the configuration of a battery element in an example of the present invention.

BEST MODE FOR CARRYING OUT THE INVENTION

Next, embodiments of the present invention will be described with reference to the drawings.

[First Embodiment]

Figure 4:
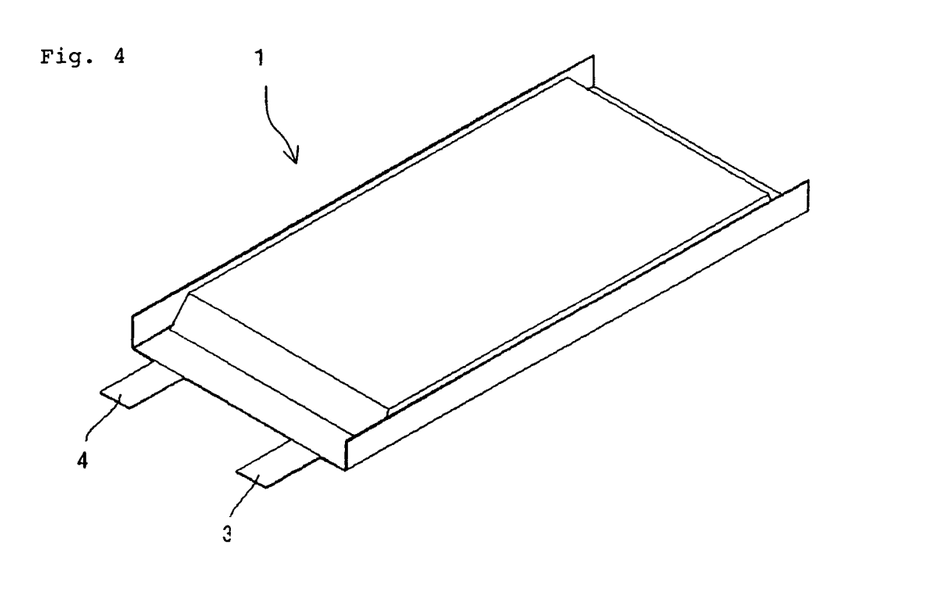
[FIG. 4]
A perspective view of a film-covered battery according to a first embodiment of the present invention.
Figure 5:
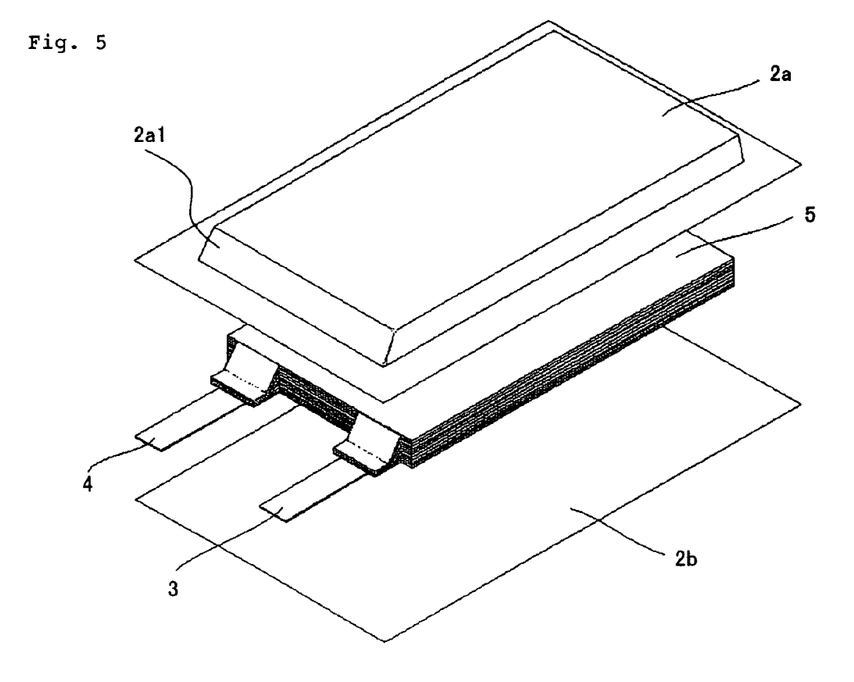
[FIG. 5]
An exploded perspective view of the film-covered battery illustrated in FIG. 4.
Figure 6:
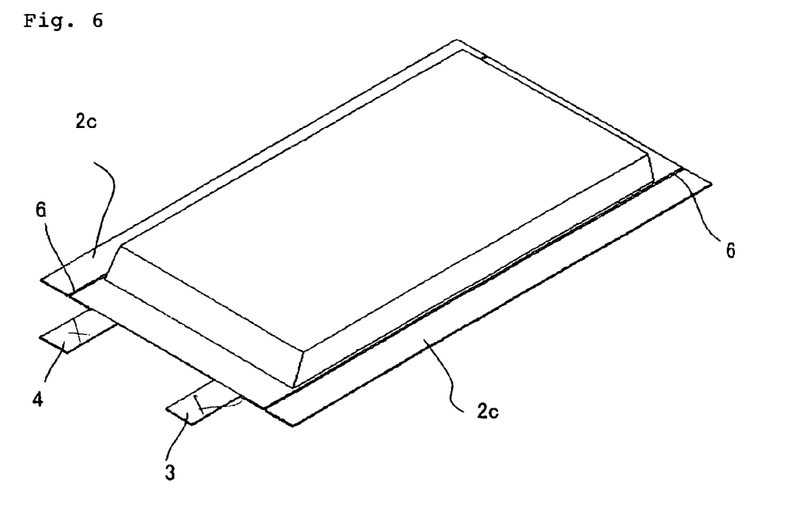
[FIG. 6]
A perspective view illustrating the state of the film-covered battery illustrated in FIG. 4 before a joint section is folded.

FIG. 4 is a perspective view illustrating the appearance of a film-covered battery according to a first embodiment of the present invention, FIG. 5 is an exploded perspective view illustrating the configuration of the film-covered battery illustrated in FIG. 4, and FIG. 6 is a perspective view illustrating the state of the film-covered battery illustrated in FIG. 4 before a joint section is folded. In this regard, FIG. 5 illustrates a film-covered battery which is not formed with a groove that is a feature of the present invention.

As illustrated in FIG. 5, film-covered battery 1 of this embodiment comprises laminate type battery element 5 (see FIG. 20) having positive electrode plates 8 and negative electrode plates 9 laminated through separators 10; rectangular covering films 2a, 2b for receiving battery element 5 together with an electrolytic solution; and positive electrode's lead terminal 3 and negative electrode's lead terminal 4 connected to a positive electrode and a negative electrode of battery element 5, respectively.

As covering films 2a, 2b, known covering materials generally used for film-covered batteries can be used, such as laminate film which is made of lamination of thin metal film and heat-seal resin. Covering films 2a, 2b of this embodiment are made by laminating protection film 2f, thin metal film 2d, and heat-seal film 2e (see FIG. 8).

Covering film 2a is formed with receiving section 2a1 for receiving battery element 5. Receiving section 2a1 may be formed, for example, by deep-draw molding. Battery element 5 is received in receiving section 2a1 of covering material 2a, and sealed by surrounding battery element 5 by sandwiching the same from above and from below together with covering film 2b, and by heat-sealing the peripheral edges of these covering films 2a, 2b. In this event, three sides of covering film 2a, 2b are first heat-sealed for formation into a bag shape. After pouring electrolytic solution into bag-shaped covering films 2a, 2b, air remaining therein is exhausted from the remaining open sides. Then, covering films 2a, 2b are hermetically sealed by heat-sealing the remaining sides.

Figure 7:
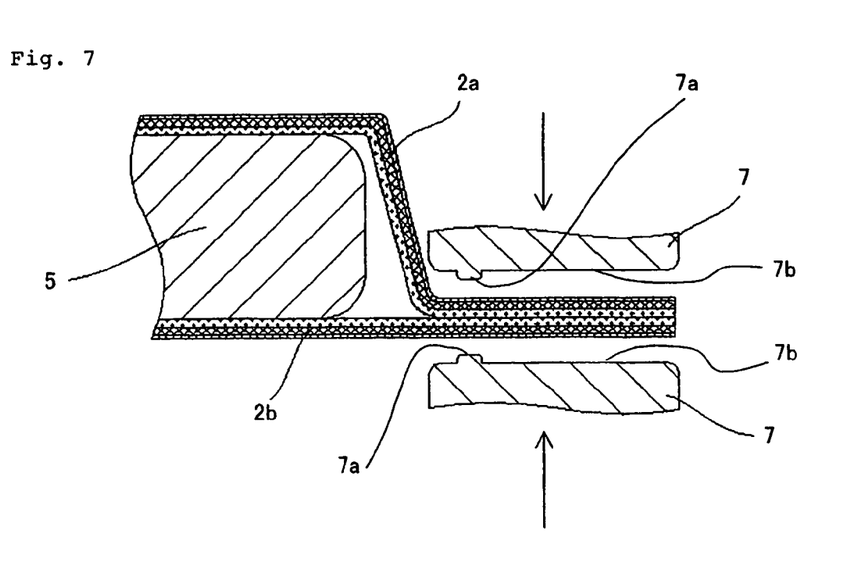
[FIG. 7]
A cross-sectional view illustrating the state of the film-covered battery illustrated in FIG. 4 when the length a long side is connected.
Figure 8:
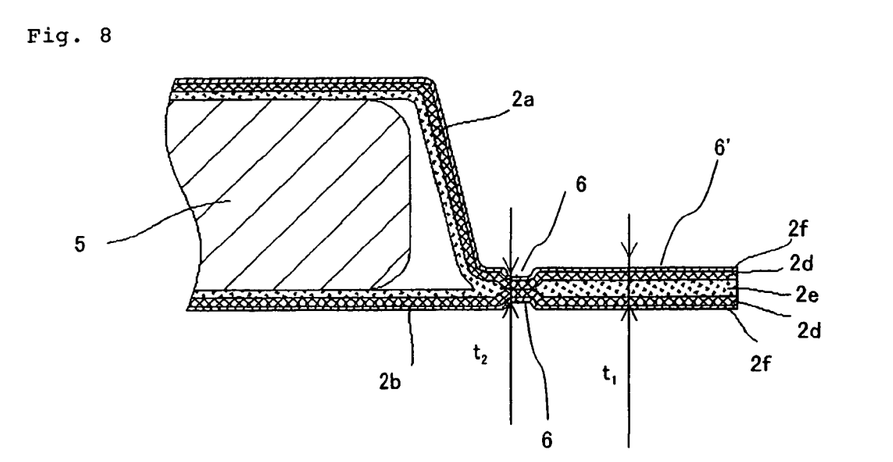
[FIG. 8]
A cross-sectional view of the joint section along the length long side of the film-covered battery illustrated in FIG. 4 before it is folded.

Covering films 2a, 2b are heat-sealed using thermal fusing head 7 having protrusions 7a and flat areas 7b, shown in a cross-sectional view in FIG. 7 when the joint section is heat-sealed. As illustrated in FIG. 7, thermal fusing head 7 sandwiches covering films 2a, 2b from both sides to heat seal them. FIG. 8 illustrates a partial cross-sectional view of the joint section after thermal fusing. A portion heat-sealed by flat area 7b is formed as flat surface 6' having thickness $t_1$, while a portion heat-sealed by protrusion 7a is formed as groove 6 having thickness $t_2$. In other words, the portion of groove 6 in covering film 2a, 2b is thinner than flat surface 6' by $\Delta t = t_1 - t_2$. Grooves 6 are formed in sides 2c which are two opposing long sides from which neither positive electrode lead terminal 3 nor negative electrode lead terminal 4 extend. These grooves 6 are folds along sides 2c which are folded toward receiving section 2a1 for reducing a projection area of film-covered battery 1.

In the case of film-covered battery 1 of this embodiment, the force required for folding is reduced by folding along groove 6 which is thinner than flat surface 6' by $\Delta t$. Also, since the existence of groove 6 defines the folded position, the joint section will not be folded at an inconvenient position. In this way, film-covered battery 1, after the folding, is readily made in uniform dimensions.

Also, according to this embodiment, in addition to the effect of improving the workability in the foregoing manner, groove 6 has thickness $t_2$ smaller than flat surface 6' by $\Delta t$, so that elongation of covering films 2a, 2b on outer side 6a can be reduced as compared with the covering films folded in the area having a thickness of $t_1$. Thus, this embodiment can prevent a crack from appearing due to excessive elongation of outer side 6a of the folded portion to improve the reliability.

As described above, film covered battery 1 formed with grooves 6 along sides 2c of this embodiment can have improved folding workability, be in uniform dimensions, and have improved reliability as a film covered battery.

In this regard, while this embodiment has shown the configuration in which grooves 6 are formed along two opposing sides 2c for folding the same, groove 6 may be formed along one or more arbitrary sides. Also, groove 6 need not be formed over the entire length of the side, and may not be formed, for example, in end regions of the side. Also, positive electrode lead terminal 3 and negative electrode's lead terminal 4 may be extended from two or more different sides. Also, the joint section may be folded in an arbitrary direction and at an arbitrary angle, such as folded substantially at 180° on the side opposite to battery element 5 receiving section. Also, while this embodiment has shown an example in which grooves 6 are formed by thermal fusing head 7 having protrusions 7a on both sides of side 2c, groove 6 may be formed only on one side.

[Second Embodiment]

Next, a film-covered battery according to a second embodiment of the present invention will be described with reference to FIGS. 10 to 15. In this regard, since the film-covered battery of this embodiment is similar in basic structure, groove forming method, and structure to the film-covered battery of the first embodiment, a detailed description is omitted.

While the first embodiment has shown a configuration in which the battery element is encapsulated by two covering films, and sealed by heat-sealing the four sides therearound, film-covered batteries 11, 21 of this embodiment have battery elements 15, 25 encapsulated in folded single covering films 12, 22, and sealed by heat-sealing the three surrounding sides.

Figure 10:
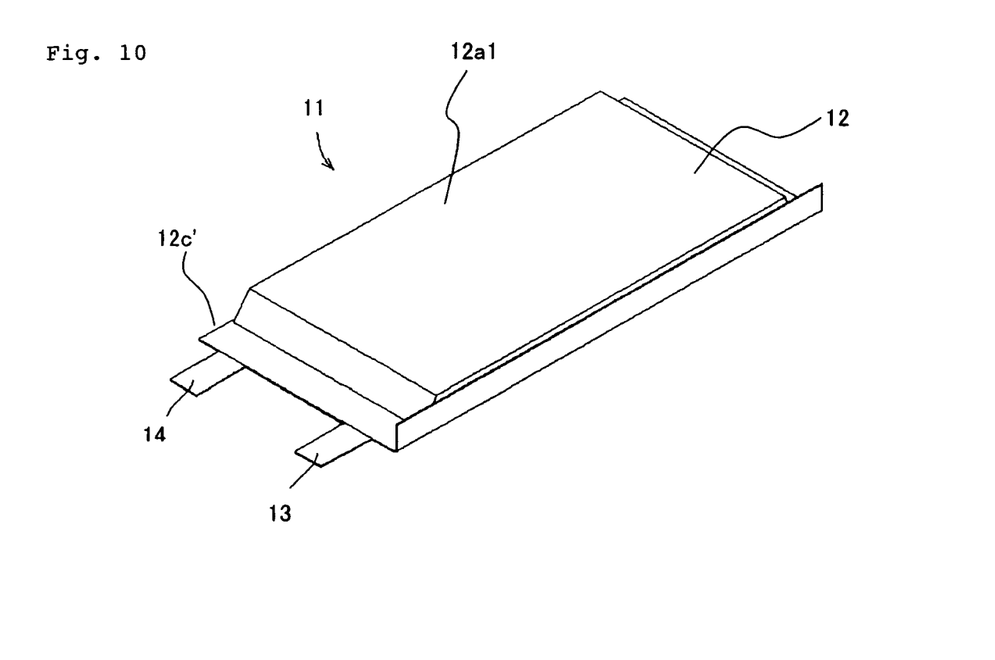
[FIG. 10]
A perspective view of a film-covered battery according to a second embodiment of the present invention.
Figure 11:
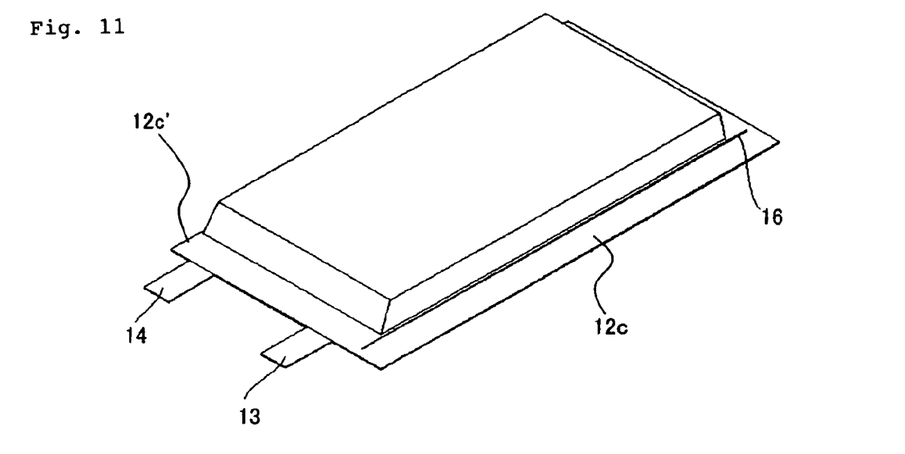
[FIG. 11]
A perspective view illustrating the state of the film-covered battery illustrated in FIG. 10 before a joint section is folded.
Figure 12:
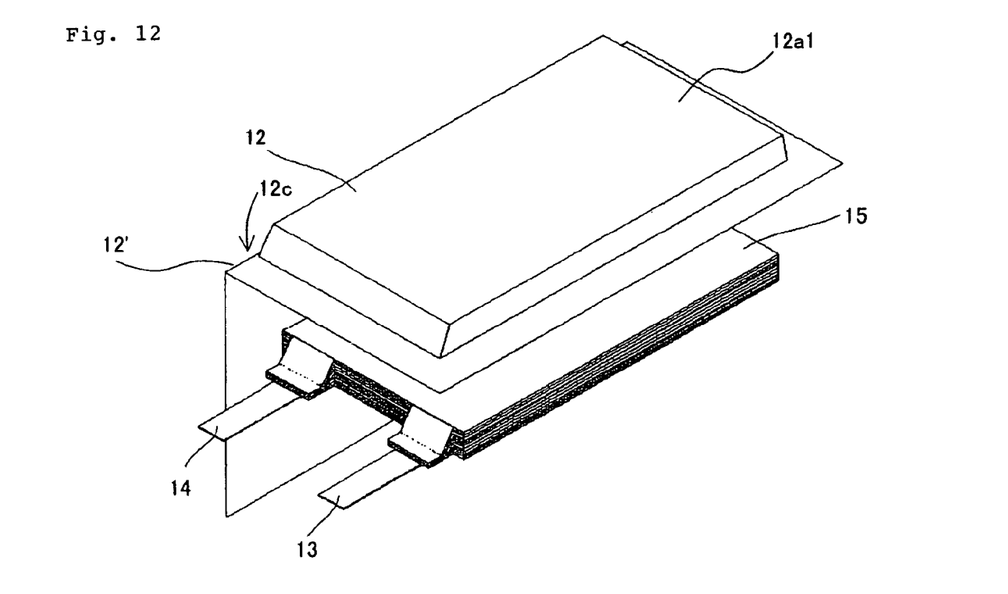
[FIG. 12]
An exploded perspective view of the film-covered battery illustrated in FIG. 10.

In an example of FIGS. 10-12, groove 16 is formed along one side opposing a side created by folding covering film 12, and a joint section thereof is folded toward receiving section 12a1 which receives battery element 15. FIG. 10 is a perspective view illustrating the appearance of the film-covered battery, FIG. 11 is a perspective view illustrating the state of the film-covered battery illustrated in FIG. 10 before the joint section is folded, and FIG. 12 is an exploded perspective view illustrating the configuration of the film-covered battery illustrated in FIG. 10.

Film-covered battery 11 illustrated in FIGS. 10-12 has covering film 12 folded along fold-over section 12' of side 12c' adjacent to a side from which positive lead terminal 13 and negative electrode lead terminal 14 extend. This film-covered battery 11 has three sides other than fold-over section 12' connected by thermal fusing as illustrated in FIG. 11, and groove 16 is formed only along side 12c opposing fold-over section 12'. The method for forming the groove and configuration of groove 16 are basically similar to the method shown in the first embodiment. Film-covered battery 11 is also formed into film-covered battery 11 having only one side folded, illustrated in FIG. 10, by folding side 12c along groove 16 toward receiving section 12a1.

Figure 13:
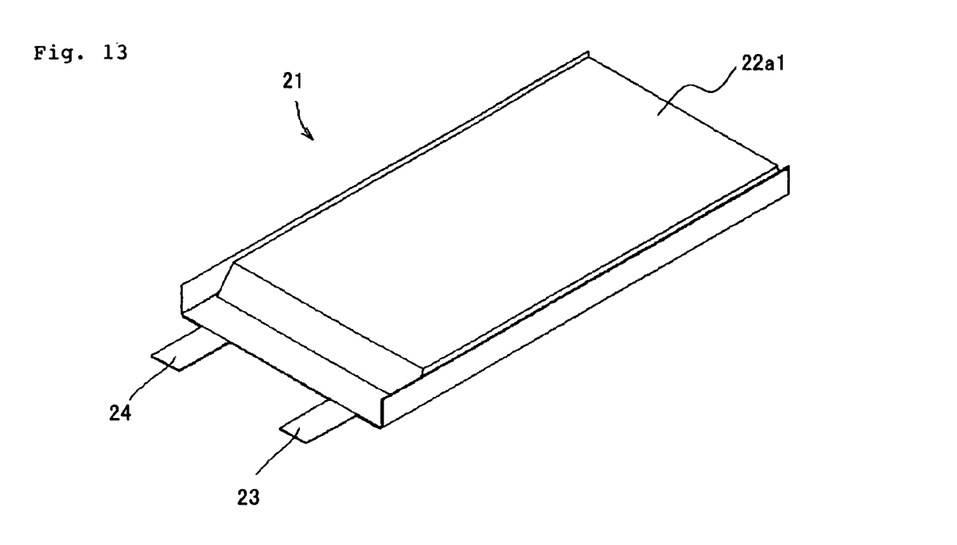
[FIG. 13]
A perspective view of another film-covered battery according to the second embodiment of the present invention.
Figure 14:
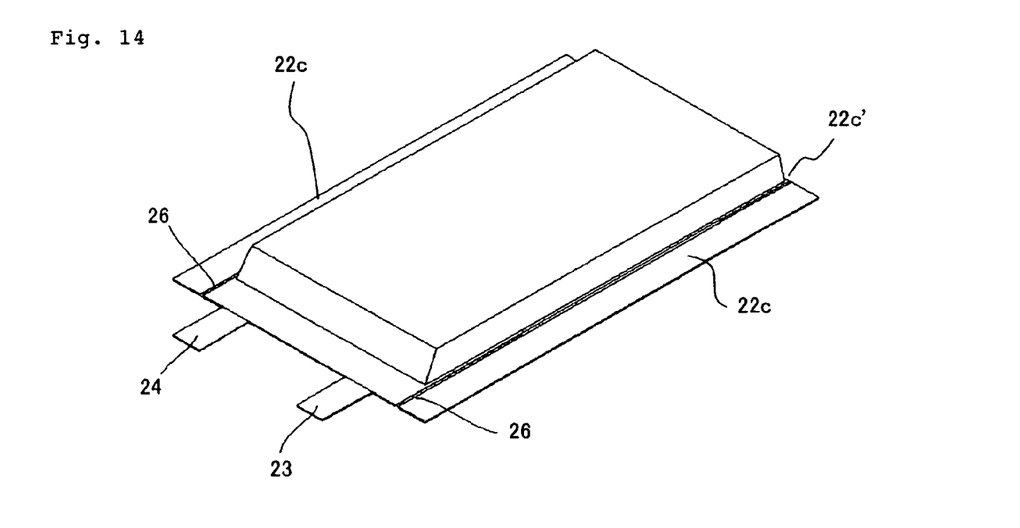
[FIG. 14]
A perspective view illustrating the state of the film-covered battery illustrated in FIG. 13 before a joint section is folded.
Figure 15:
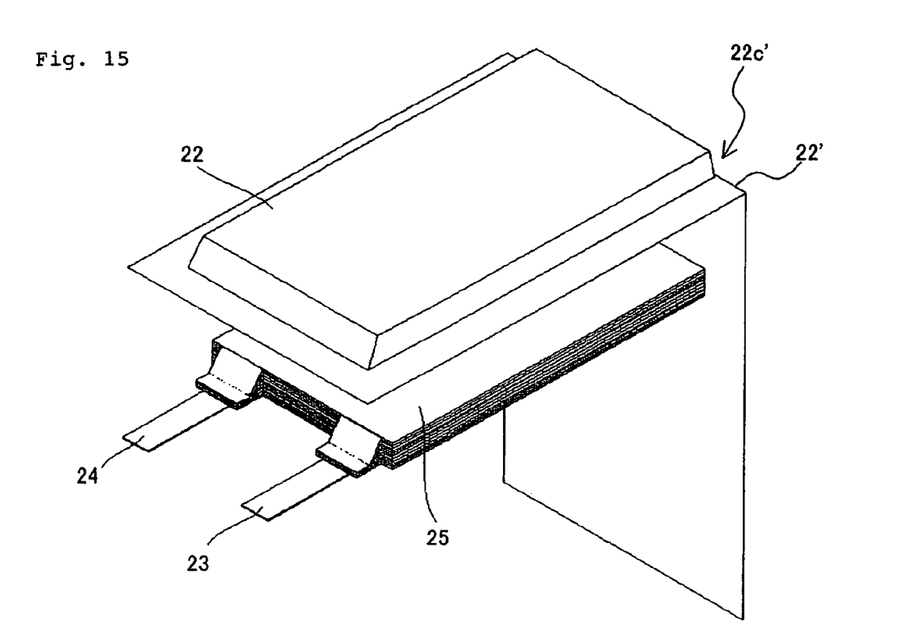
[FIG. 15]
An exploded perspective view of the film-covered battery illustrated in FIG. 13.

On the other hand, in the example of FIGS. 13-15, protrusions for positive electrode lead terminal 23 and negative electrode lead terminal 24 are provided on a side created by folding covering film 22 and on an opposing side, and grooves 26 are formed along the two other sides, and these two other sides are folded. The remaining configuration is similar to the first embodiment, so that a description thereon is omitted. FIG. 13 is a perspective view illustrating the appearance of the film-covered battery, FIG. 14 is a perspective view illustrating the state of the film-covered battery illustrated in FIG. 13 before the joint section is folded, and FIG. 15 is an exploded perspective view illustrating the configuration of the film-covered battery illustrated in FIG. 13.

As illustrated in the exploded perspective view of FIG. 15, film-covered battery 21 illustrated in FIGS. 13-15 has covering film 22 folded along fold-over section 22' on side 22c' which opposes a side from which positive electrode's lead terminal 23 and negative electrode's lead terminal 24 extend. As illustrated in FIG. 14, film-covered battery 21 has three sides connected by thermal fusing except for fold-over section 22'. Then, grooves 26 are formed along this side 22c' and two sides 22c except for the side from which positive electrode's lead terminal 23 and negative electrode's lead terminal 24 extend. The method for forming the groove and configuration of grooves 26 are also basically similar to the method shown in the first embodiment. A The Film-covered battery is also formed into film-covered battery 21 which has two sides folded in a manner similar to film-covered battery 1 in the first embodiment, as illustrated in FIG. 13, by folding each side 22c along groove 26 toward receiving section 22a1.

Thus, like film-covered battery 1 in the first embodiment, film-covered batteries 11, 21 of this embodiment formed with grooves 16, 26 along sides 12c, 22c can have improved folding workability and be made in uniform dimensions.

Also, film-covered batteries 11, 21 of this embodiment can reduce exposed sides of heat-seal resin film 22e, which can be a leak path, by receiving the battery element in single folded covering films 12, 22, as compared with the battery element received using two covering films, thus making it possible to better prevent a degradation in performance and reliability of film-covered batteries 11, 22 due to the introduction of external moisture and the escape of electrolytic solution.

Likewise, in this embodiment, the groove need not be formed over the entire length of the side, and may not be formed, for example, in end regions of the side. Also, the positive electrode's lead terminal and negative electrode's lead terminal may be extended from two or more different sides. Also, the joint section may be folded in an arbitrary direction and at an arbitrary angle, such as folded substantially at 180° on the side opposite to the battery element receiving section. Also, grooves 16, 26 may be formed on both sides or formed only on one side.

[Third Embodiment]

Next, a film-covered battery according to a third embodiment of the present invention will be described with reference to FIGS. 16-19. In this regard, since the film-covered battery of this embodiment is similar in basic structure, groove forming method, and structure to the film-covered battery of the first embodiment, a detailed description is omitted.

Figure 16:
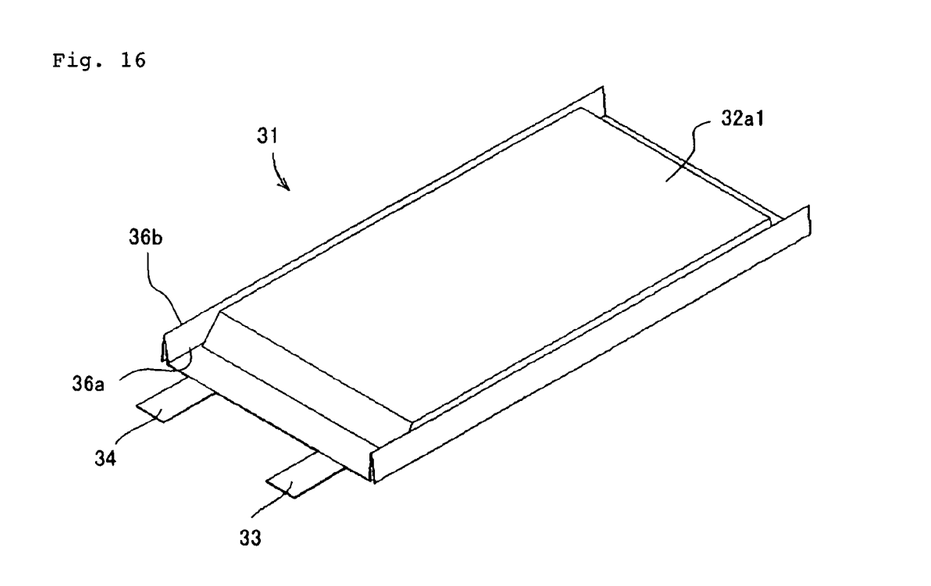
[FIG. 16]
A perspective view of a film-covered battery according to a third embodiment of the present invention.
Figure 17:
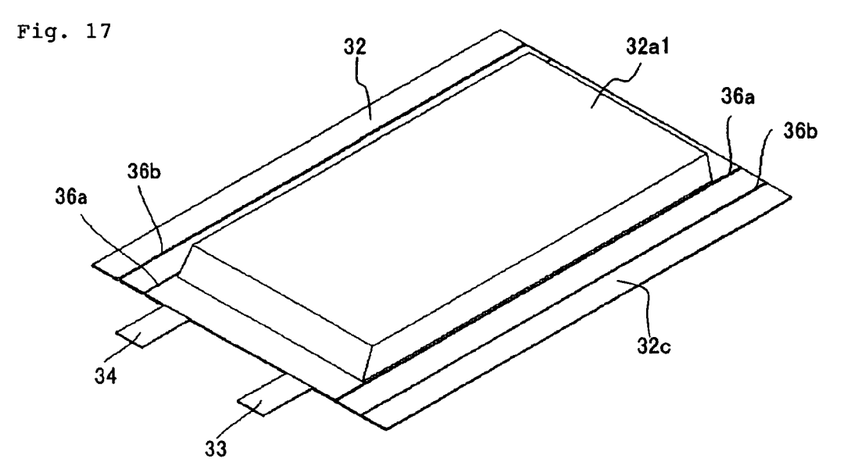
[FIG. 17]
A perspective view illustrating the state of the film-covered battery illustrated in FIG. 16 before a joint section is folded.

The film-covered battery according to the third embodiment of the present invention has a heat-sealed section of covering films folded a plurality of times to further reduce the projection area of the film-covered battery. FIGS. 16 and 17 illustrate an example in which two grooves are formed along one side, while FIGS. 18 and 19 illustrate an example in which three grooves are formed along one side.

FIG. 16 is a perspective view illustrating the appearance of the film-covered battery having two grooves formed along one side according to the third embodiment of the present invention, and FIG. 17 is a perspective view illustrating the state of the film-covered battery illustrated in FIG. 16 before the joint section is folded.

As illustrated in FIG. 17, two grooves 36a, 36b are formed substantially in parallel along two sides 32c from which neither positive electrode's lead terminal 33 nor negative electrode's lead terminal 34 is extended. Groove 36a is provided for folding side 32c toward receiving section 32a1 in a manner similar to the respective embodiments described above. Groove 36b formed outside of groove 36a is provided for again folding over side 32c which has been folded up along groove 36a which results in an edge. In other words, groove 36b is located at the peak of side 32c folded in a mountain shape. Since side 32c is folded along grooves 36a, 36b, film-covered battery 31 has a further reduced projection area.

Figure 18:
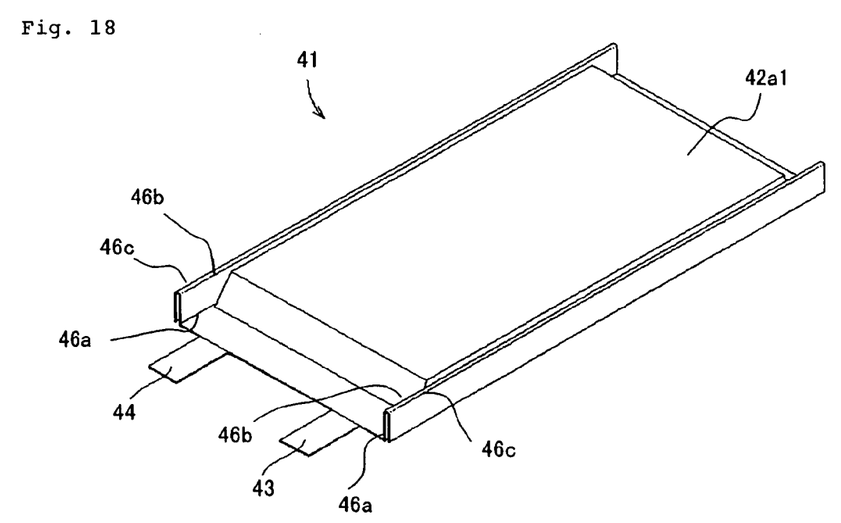
[FIG. 18]
A perspective view of another film-covered battery according to the third embodiment of the present invention.
Figure 19:
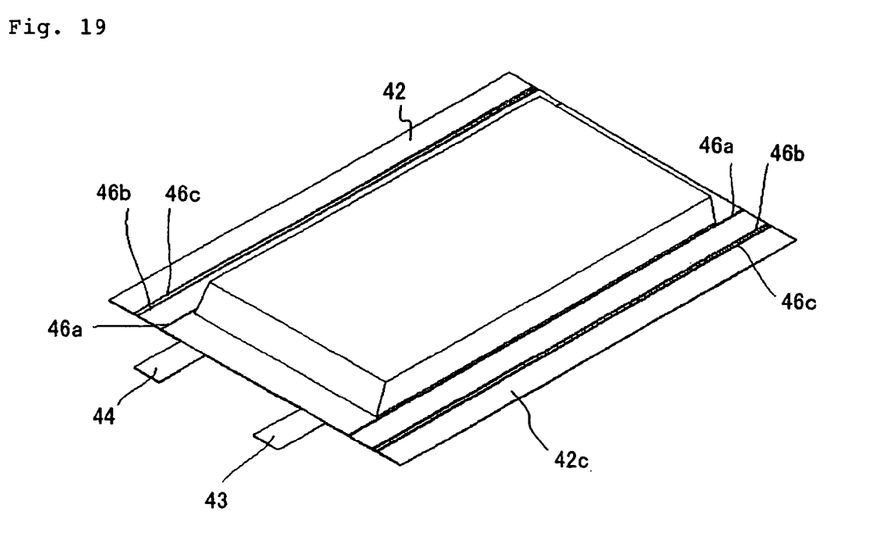

On the other hand, FIG. 18 is a perspective view illustrating the appearance of a film-covered battery formed with three grooves along one side, and FIG. 19 is a perspective view illustrating the state of the film-covered battery illustrated in FIG. 18 before the joint section is folded.

As illustrated in FIG. 18, three grooves 46a, 46b, 46c are formed substantially in parallel, respectively, along two sides 42c from which neither positive electrode's lead terminal 44 nor negative electrode's lead terminal 44 extend. Groove 46a is provided for folding side 42c toward receiving section 42a1 in a manner similar to the respective embodiments described above. Grooves 46b, 46c formed outside of grooves 46a, which are formed in close proximity to each other, are provided for again folding over side 42c which has been folded up along groove 46a which results in an edge. Specifically, although side 42c is folded in a mountain shape in this embodiment as well, side 43c is folded by nearly 90° at each of two locations along grooves 46b, 46c, instead of folding by nearly 180° at one location as in the example illustrated in FIGS. 16 and 17, thereby further reducing damage to the covering films due to folding at an acute angle. Film-covered battery 41 also has a further reduced projection area because side 42c is folded along grooves 46a, 46b, 46c.

Thus, film-covered batteries 31, 41 of this embodiment formed with grooves 36a, 36b along side 32c and grooves 46a, 46b, 46c along side 42c can have improved the folding workability, be made in uniform dimensions, and have improved reliability as a film-covered battery, like film-covered battery 1 of the first embodiment.

Also, the film-covered batteries of this embodiment have further reduced projection areas because the battery element is placed in covering films 32, 42 which are folded in a mountain shape.

Likewise, in this embodiment, the groove need not be formed over the entire length of the side, but may not be formed, for example, in end regions of the side. Also, the positive electrode's lead terminal and negative electrode's lead terminal may be extended from two or more different sides. Also, the joint section may be folded on the side opposite to the battery element receiving section, and the number of formed grooves may be three or more.

Also, in the respective embodiments described above, the fold has been made in a so-called groove shape, but the fold may be in any shape as long as the thickness of the fold is smaller than the thickness of the joint section other than the fold. For example, the fold may be in the shape of smooth concave.

Also, in the respective embodiments described above, the grooves on the outer side and inner side of the fold, shown as an example, have substantially the same groove shape, but the grooves are not so limited, and the groove on the outer side may have a different cross-sectional shape from the groove on the inner side. For example, the groove on the outer side may have the bottom wider than that of the groove on the inner side, or vice versa. Also, while the respective embodiments have shown the grooves in a concave shape on both sides as an example, the grooves are not so limited, but only one of those on the outer side and inner side of the fold may be in a concave shape.

EXAMPLE

Next, a specific example of the present invention will be described with reference to the drawings used for describing the first embodiment, giving film-covered battery 1 in the aforementioned first embodiment as an example.
<Fabrication of Positive Electrodes>

In this example, lithium manganate powder having a spinel structure, a material which is carbonaceous and imparts electrical conductivity, and polyvinylidene fluoride were mixed and dispersed in N-methyl-pyrolidone (represented by NMP in some cases) in a mass ratio of 90:5:5, and stirred into slurry. The amount of NMP was adjusted such that the slurry would have a proper viscosity. This slurry was uniformly coated on one side of an aluminum foil having a thickness of 20 μm, which would serve as positive electrode plate 8, using a doctor blade. The coating was made such that striped parts of a small region(in which the aluminum foil exposed) were left uncoated. Next, the aluminum foil coated with this slurry was dried in vacuum at 100° C. for two hours. Subsequently, the other side of the aluminum foil was also coated with the slurry in a similar manner, and dried in a vacuum. In this event, the slurry was coated such that the uncoated regions matched on the front and back sides.

The aluminum foil thus coated with an active material on both sides was roll pressed. This was cut into rectangles, including the region not coated with the active material, which were used as positive electrode plates 8. The region which was not coated with active material was cut away except for a portion thereof on one side which was left in a rectangular shape, and the left portion was used as a tab.
<Fabrication of Negative Electrodes>

Amorphous carbon powder and polyvinylidene fluoride were mixed and dispersed in NMP in a mass ratio of 91:9, and stirred into slurry. The amount of NMP was adjusted such that the slurry would have a proper viscosity. This slurry was uniformly coated on one side of a copper foil having a thickness of 10 μm, which would serve as negative electrode plate 6, using a doctor blade. The coating was made such that striped parts of a small region(in which the acopper foil exposed) were left uncoated. Next, the copper foil coated with this slurry was dried in a vacuum at 100° C. for two hours. In this event, the thickness in which the active material had been coated was adjusted such that the logical capacity of negative electrode plate 9 per unit area and the logical capacity of positive electrode plate 8 per unit area was 1:1. Subsequently, the other side of the copper foil was also coated with the slurry in a similar manner, and dried in a vacuum.

The copper foil thus coated with an active material on both sides was roll pressed. This was cut into rectangles whose vertical and horizontal dimensions were each 2 mm larger than those of positive electrode plates 8, including the region not coated with the active material, which was used as negative electrode plates 9. The region which was not coated with active material was cut away except for a portion thereof on one side which was left in a rectangular shape, and the left portion was used as a tab.
<Fabrication of Battery Element>

Figure 20:
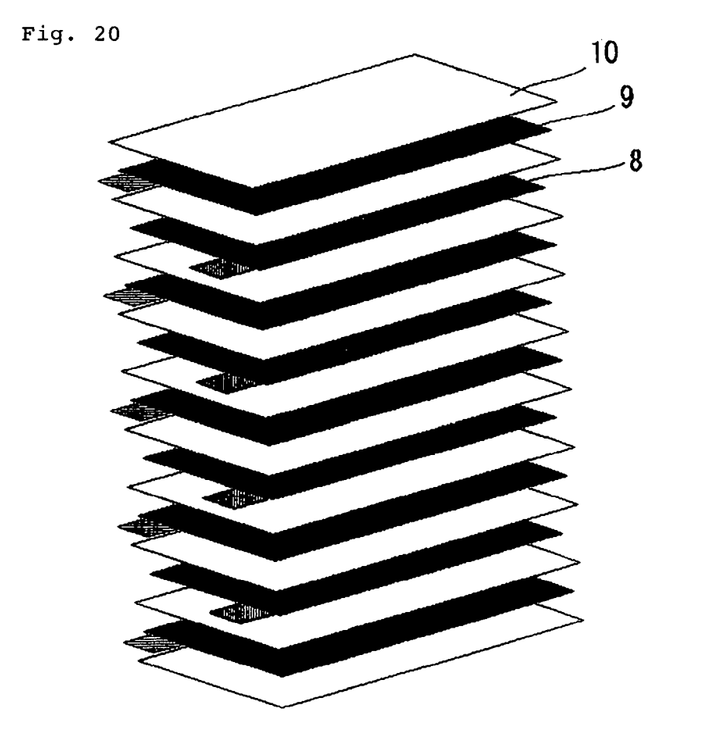

Positive electrode plates 8 and negative electrode plates 9 fabricated in the foregoing manner, and separators 10 made of a micro-porous sheet having a three-layered structure of polypropylene layer/polyethylene layer/polypropylene layer were laminated one on another as illustrated in FIG. 20. In this event, negative electrode plate 9 was chosen for the outermost electrode plate, and separator 10 was placed further outside this negative electrode plate 9 (in other words, they were laminated in the order of separator/negative electrode plate/separator/positive electrode plate/separator/ . . . /negative electrode plate/separator).

Next, the tabs of positive electrode plates 8 and positive electrode's lead terminal 3 made of an aluminum plate with a thickness of 0.1 mm were collectively ultrasonic-welded to make a charge collector with a positive electrode. Likewise, the tabs of negative electrode plates 9 and negative electrode's lead terminal 4 made of a nickel plate with a thickness of 0.1 mm were collectively ultrasonic-welded to make a charge collector with a negative electrode.
<Sealing of Battery Element>

Two covering films 2a, 2b which are aluminum laminate films having a four-layered structure of nylon layer/aluminum layer/acid modified polypropylene layer/polypropylene layer were used as covering materials. Covering film 2a was formed with a recess whose size was slightly larger than battery element 5 by deep-draw molding, such that covering film 2a is concave on polypropylene layer side, to create receiving section 2a1.

Battery element 5 mentioned above was received by two covering films 2a, 2b, laid one on top of the other, such that only positive electrode's lead terminal 3 and negative lead terminal 4 extended from covering films 2a, 2b, and three surrounding sides of covering films 2a, 2b were connected by thermal fusing. The length of the two the two opposing long sides adjacent to the side from which the lead terminals extended were heat-sealed using a thermal fusing apparatus having protrusions on the surfaces of the fusing part of thermal fusing head 7, as illustrated in FIG. 7 to create a joint section having grooves 6 illustrated in the perspective view of FIG. 6 and in the cross-sectional view of FIG. 8.

Next, an electrolytic solution was poured into the interior of covering films 2a, 2b, in which battery element 5 had been received, from the remaining sides which were not connected.

The electrolytic solution that was used was made up of 1 mol/liter of $LiPF_6$ serving as a supporting electrolyte, and a mixed solvent of propylene carbonate and ethylene carbonate (mass ratio is 50:50). After the electrolytic solution was poured, air remaining inside was exhausted from the remaining open sides of covering films 2a, 2b, and battery element 5 was sealed by heat-sealing the remaining side.

Figure 9:
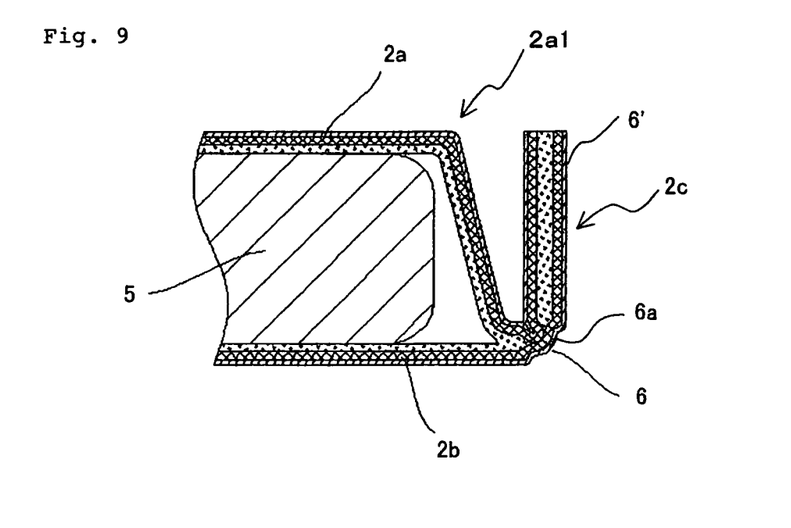
[FIG. 9]
A perspective view of the joint section along the length long sides of the film-covered battery illustrated in FIG. 4.

Finally, the joint section was folded substantially at right angles toward receiving section 2a1 such that groove 6 formed an edge, as illustrated in the cross-sectional view of FIG. 9, thereby fabricating film-covered battery 1 which was a lithium secondary battery having covering materials made of a laminate film.

While the present invention has been described in connection with several representative embodiments and specific examples, it is apparent that the present invention is not limited to them, and can be modified as appropriate within the scoop of the technical philosophy of the present invention.

For example, while a laminate film of a thin metal film and a heat-seal resin have been used as a flexible covering material, other materials can also be used so long as they have a property that will adequately seal the battery element Also, while the battery element that is used as an example is a laminate type which has been used to alternatively laminate the positive electrode plates and the negative electrode plates, the present invention can also be applied to winding type element. Also while the battery elements of a lithium secondary battery has been given as an example to describe the battery elements, the present invention can be applied to battery elements for other types of chemical batteries such as a nickel hydrogen battery, a nickel cadmium battery, a lithium metal primary battery or secondary battery, a lithium polymer battery and the like, as well as a capacitor element and the like.

The invention claimed is:

1. A film covered battery composed of battery elements having a configuration in which a positive electrode faces a negative electrode, and a covering film having at least a heat-seal resin layer and a thin metal film layer that are laminated by a laminate protection film layer, for encapsulating said battery element with said heat-seal resin layer being positioned inside, and sealing said battery element by heat-sealing a joint section along a peripheral edge, said joint section having at least one folded side, said film-covered battery characterized in that said joint section is formed with at least one fold, and said fold has a thickness smaller than a thickness around said fold, wherein said fold has a thickness of said heat-seal resin layer smaller than a thickness of said heat-seal resin layer around said fold,
wherein the laminate protection film layer has a uniform thickness along said joint section in a direction perpendicular to said fold.

2. The film-covered battery according to claim 1, wherein said fold is a groove.

3. The film-covered battery according to claim 2, wherein said groove is formed in at least one side of said joint section.

4. The film-covered battery according to claim 1, wherein a plurality of said folds are formed in said joint section, such that said joint section is folded along each of said folds.

5. The film-covered battery according to claim 2, wherein a plurality of said folds are formed in said joint section, such that said joint section is folded along each of said folds.

6. A film covered battery composed of battery elements having a configuration in which a positive electrode faces a negative electrode, and a covering film having at least a heat-seal resin layer and a thin metal film layer that are laminated by a laminate protection film layer, for encapsulating said battery element with said heat-seal resin layer being positioned inside, and sealing said battery element by heat-sealing a joint section along a peripheral edge, said joint section having at least one folded side, said film-covered battery characterized in that said joint section is formed with a plurality of folds, said folds have a thickness smaller than a thickness of said joint section around said folds, wherein said fold has a thickness of said heat-seal resin layer smaller than a thickness of said heat-seal resin layer around said fold, said folds are grooves formed in at least one side of said joint section, and said joint section is folded along each of said folds,
wherein the laminate protection film layer has a uniform thickness along said joint section in a direction perpendicular to said fold.

7. The film-covered battery according to claim 1, wherein said battery element is one of a chemical battery and a capacitor.

8. The film-covered battery according to claim 1, wherein when said joint section is folded along said fold, at an inner side of said fold, portions of said covering film are in contact with each other and outer portions of said covering film that are located outside said portions that are in contact with each other are spaced apart from each other.

9. The film-covered battery according to claim 1, wherein said joint section is formed with one fold along one side opposing a side created by folding said covering film.

10. The film-covered battery according to claim 1, wherein a groove is formed in a portion other than both ends of said folded side, said groove having a length larger than a length of a receiving section of said covering film that receives said battery elements, and said joint section is folded along said groove.

* * * * *